No. 631,625. Patented Aug. 22, 1899.
W. J. EN EARL.
GRAIN DAMPENER.
(Application filed Apr. 4, 1898.)
(No Model.)

WITNESSES:

INVENTOR
W. J. En Earl,
BY
ATTORNEYS.

UNITED STATES PATENT OFFICE.

WILLIAM JOHN EN EARL, OF DENVER, COLORADO, ASSIGNOR OF ONE-THIRD TO ERWIN D. HAWLEY, OF SAME PLACE.

GRAIN-DAMPENER.

SPECIFICATION forming part of Letters Patent No. 631,625, dated August 22, 1899.

Application filed April 4, 1898. Serial No. 676,398. (No model.)

*To all whom it may concern:*

Be it known that I, WILLIAM JOHN EN EARL, of Denver, in the county of Arapahoe and State of Colorado, have invented a new and Improved Grain-Dampener, of which the following is a full, clear, and exact description.

My invention relates to an improvement in devices intended for dampening grain or similar material.

It comprises the novel features of construction hereinafter described and claimed.

Reference is to be had to the accompanying drawings, forming a part of this specification, in which similar characters of reference indicate corresponding parts in both figures.

Figure 1:
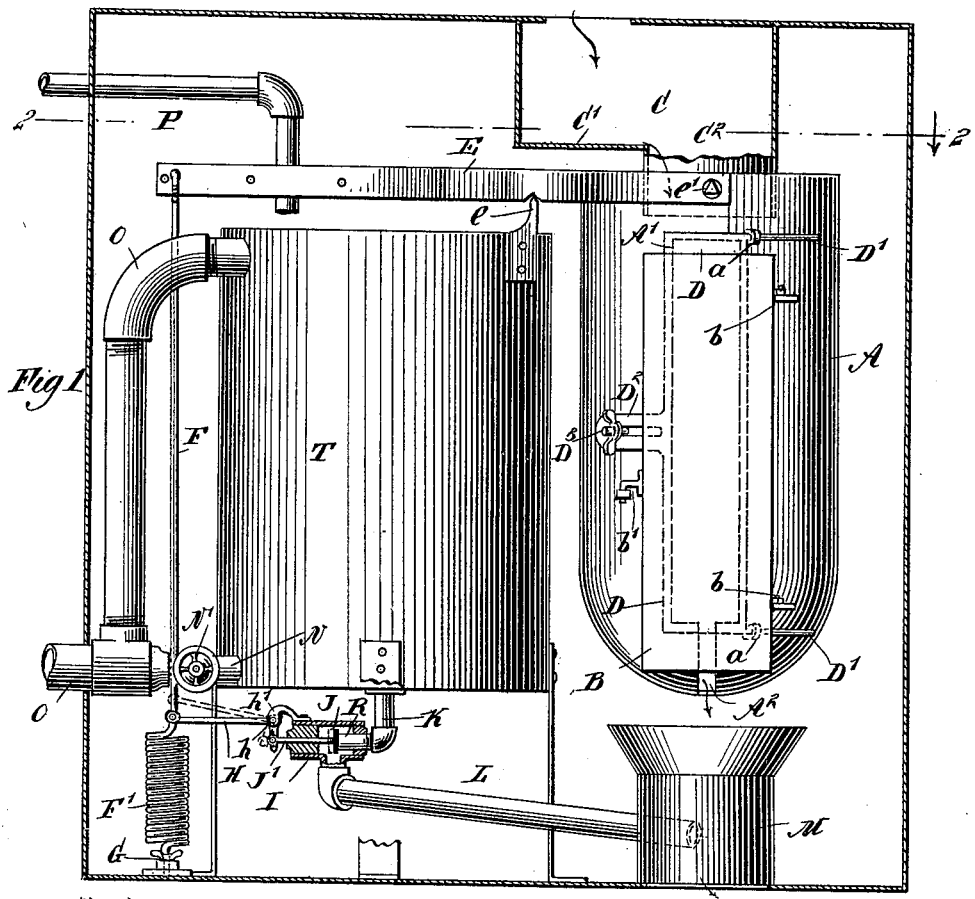
Figure 2:
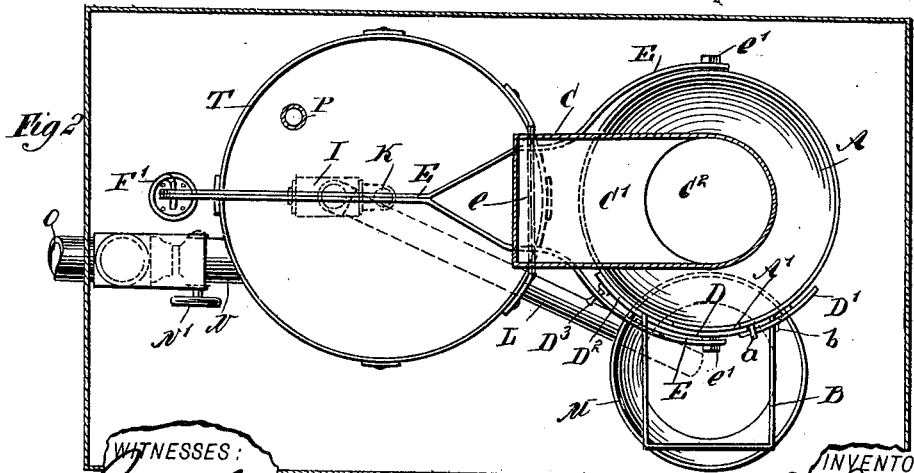

Figure 1 is a side elevation of my device with parts in section, and Fig. 2 is a sectional view on the line 2 2 in Fig. 1.

The object of my invention is to provide a mechanism for dampening grain and similar material which shall automatically control the supply of water, so that the grain will be uniformly dampened, and thus prevent some portions of the grain from being excessively dampened while other portions are comparatively dry. This result is secured by the mechanism hereinafter described.

A hopper A is provided, which may be of any suitable form. As herein shown, it is constructed as a cylinder having a rounded or hemispherical lower end. This hopper is provided with a narrow slot $A^2$ in its lower end adapted to entirely discharge the hopper when the supply is cut off. The hopper is also provided with a vertically-extending slot A' in one side thereof. This slot is partially or entirely covered by a plate D, secured to the outer side of the hopper and adjustable thereon, so as to partially or entirely cover the slot at will. The method of this adjustment is shown in Fig. 1, wherein rods D' are secured at each end to the plate and passed through eyes $a$, attached to the hopper, and a slide-bar $D^2$ is secured to the center of the opposite edge of the plate D and is held to the hopper by a bolt and thumb-nut $D^3$. This permits the plate D to be adjusted, so as to cover the slot more or less, as desired.

A casing B is attached to the side of the hopper, so as to house the slot A' and prevent the grain as it issues from the slot being discharged to such a distance from the hopper as to clear the receiving-hopper M, which is located beneath the slot. This casing may be attached to the hopper in any suitable manner. As herein shown, it is hinged thereto by the hinges $b$ and locked in place by a catch $b'$.

The hopper is supported from a lever E by means of pins $e'$, entering holes in the ends of the forked arms of the lever E. This lever is made in a Y shape or has one end forked, so as to embrace the upper end of the hopper. The lever is pivoted upon a fulcrum $e$, mounted upon any suitable support. As herein shown, this support consists of the tank T, which acts as a reservoir for supplying the water. To the opposite end of the lever E is attached a rod F, to which is attached a spring F'. This spring is secured to the base of the casing in which the dampening device is located by having its end threaded and placing a thumb-nut G thereon, by which means the tension of the spring may be adjusted.

The reservoir T is supplied with water through a pipe P or other suitable means and is provided with an overflow-pipe O, connected with the same near the top, and with a cleaning-pipe N, entering the same from the bottom and provided with a closing-valve N'. Water is taken from the reservoir T through a pipe K, and to this pipe is attached a valve by which the flow of water is regulated. This valve may be of any suitable construction by which a reciprocating rod is enabled to control the outflow.

As herein shown, the valve consists of a T-casing I, provided with a plug at one end, forming a stuffing-box for the valve piston-rod J'. Through the opposite end projects a short section of pipe R, upon which the piston J seats to control or stop the flow of water. From this valve a pipe L leads to the receiving-hopper M, where the water and the grain are mixed.

Upon the T-casing I is mounted an arm $h'$, to which at $h$ is pivoted a bell-crank lever H. This lever is connected at one end to the piston-rod J' of the valve and at its other end to the rod F. As the hopper A descends under influence of the weight of grain therein the valve J will be opened, the degree of the opening depending upon the weight of grain in the hopper. If the hopper becomes empty, the spring F' will pull down the lever E and close the valve J, so as to cut off the flow of water. The slot A' in the side of the hopper A being narrow and extending nearly the height of the hopper, the grain will back up in the hopper to a height corresponding with the volume of flow. The weight of grain in the hopper is thus enabled to control the opening of the valve J. The amount of water furnished for the same weight is also adjustable by adjusting the plate D over the slot A'. When the slot is widened, a smaller proportion of water will be furnished than when the slot is narrowed. As a consequence the device may be set to vary the amount of water supplied to the grain to meet the requirements. The grain will therefore be uniformly dampened whatever the volume of flow.

To prevent the impact of the grain when falling into the hopper interfering with the exact regulation of the device, a receiving-box C is provided just above the hopper and has an opening $C^2$ in one end thereof and a portion C' of the bottom, which receives the grain from the supply-pipe. This causes a uniform drop of the grain into the hopper, and thus does away with irregularity due to the falling of the grain into the hopper from different heights.

It is obvious that this device may be used for dampening any kind of grain or granular material, such as sand, gravel, or any material of this nature which may be passed through a narrow slot such as that in the side of the hopper. I do not therefore wish to limit my invention to its use in connection with grain only. Its principal use is, however, for dampening wheat previous to grinding in order that the hull may be removed without removing any of the body of the grain.

It is evident that the lower end of the hopper may be made of any shape which will permit the grain to flow to the discharge-slot, so as to entirely empty the hopper. A hemispherical bottom is shown, but this shape is not in any sense an essential one.

Having thus fully described my invention, I claim as new and desire to secure by Letters Patent—

1. In a device for dampening grain and similar material, the combination of a spring-counterbalanced hopper having a vertically-extending slot in one side and adapted to receive the grain, with a water-supply discharging into the grain, and a valve in said water-supply controlled by the weight of grain in the hopper, substantially as described.

2. In a device for dampening grain and similar material, the combination of a hopper having a vertical discharge-slot, with a water-supply discharging into the grain and controlled in quantity by the weight of grain in the hopper, substantially as described.

3. In a device for dampening grain and similar material, the combination of a hopper having a vertical discharge-slot, and means for changing the width of said slot, with a water-supply discharging into the grain and controlled in quantity by the weight of grain in the hopper, substantially as described.

4. In a device for dampening grain and similar material, the combination of a hopper having a vertical discharge-slot, and means for changing the width of said slot with a water-supply discharging into the grain, and a valve in said water-supply controlled by the weight of grain in the hopper, substantially as described.

5. In a device for dampening grain and similar material, the combination of a hopper having a vertical discharge-slot, a pivoted lever having at one end supporting connection with the hopper, and a counterbalancing-spring connected to the lever, with a water-reservoir, a discharge-valve therefor, and connections from said valve to the pivoted lever whereby the valve opening is controlled by the weight of the hopper contents, substantially as described.

6. The combination of a valve with controlling means therefor operative by variation in flow of a material, and comprising a hopper receiving said material and having a vertical discharge-slot in one side, a weight-controlled yielding support for the hopper, and controlling connection between the hopper and valve, substantially as described.

7. The combination of a valve with controlling means therefor operative by variation in flow of a material and comprising a hopper receiving said material and having a vertical discharge-slot in one side, means for adjusting the width of the slot, a weight-controlled yielding support for the hopper, and connection between the hopper and valve, substantially as described.

8. The combination of a valve with controlling means therefor operative by variation in flow of a material and comprising a hopper receiving said material and having a vertical discharge-slot in one side, a plate mounted in guides upon the hopper and adapted to vary the slot opening, a weight-controlled yielding support for the hopper, and connection between the hopper and valve, substantially as described.

9. In a device for dampening grain and similar material, the combination of a hopper having a vertical discharge-slot, a pivoted lever having suspending connection at one end with the hopper, and a counterbalancing-spring connected to the lever, with a water-reservoir, a discharge-valve therefor having a stem extending to the outside, a lever connected thereto and adapted to regulate the valve opening, and connection from said lever to the hopper-supporting lever, substantially as described.

10. The combination of a valve, with controlling means therefor, operative by variation in flow of a material said means comprising a retarding-hopper receiving said material and having a discharge-slot therein of fixedly constant opening, said opening having an excess of area so that a portion only is used at one time, a weight-controlled yielding support for the hopper, and controlling connections between the hopper and valve.

11. The combination of a valve with controlling means therefor, operative by variation in flow of a material, said means comprising a retarding-hopper receiving said material and having a discharge-slot extending above or beyond the flow-line of the material, whereby it is operative in proportion to the volume of flow, a yielding support for the hopper, and connections from the hopper to the valve.

12. The combination of a valve, with controlling means therefor operative by variation in flow of material, said means comprising a hopper having a vertical discharge-slot extending longitudinally thereof, which is operative as an outlet to an extent proportioned to the volume of flow of the material passing through the hopper, a weight-controlled yielding support for the hopper, and controlling connection between the hopper and valve.

WILLIAM JOHN EN EARL.

Witnesses:
ERWIN D. HAWLEY,
HOMER J. HAWLEY.